(12) United States Patent
Mitsui et al.

(10) Patent No.: US 7,060,411 B2
(45) Date of Patent: Jun. 13, 2006

(54) DIELECTRIC PASTE AND MANUFACTURING METHOD OF PLASMA DISPLAY

(75) Inventors: Hiroko Mitsui, Otsu (JP); Junji Mata, Otsu (JP); Kentaro Okuyama, Kyoto (JP); Akihiko Tanaka, Kyoto (JP); Hitoshi Nobumasa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/272,990

(22) Filed: Oct. 18, 2002

(65) Prior Publication Data

US 2003/0129546 A1 Jul. 10, 2003

(30) Foreign Application Priority Data

Oct. 23, 2001 (JP) .............................. 2001-325058
Mar. 6, 2002 (JP) .............................. 2002-060093

(51) Int. Cl.
*H01J 9/00* (2006.01)
(52) U.S. Cl. ....................... 430/198; 430/319; 430/321; 430/330; 445/24
(58) Field of Classification Search ................ 430/198, 430/319, 321, 330; 445/24
See application file for complete search history.

(56) References Cited

U.S. PATENT DOCUMENTS 6,197,480 B1   3/2001   Iguchi et al.

FOREIGN PATENT DOCUMENTS

| JP | 07-057630 | | 3/1995 |
|---|---|---|---|
| JP | 10-337524 | | 12/1998 |
| JP | 11-007894 | | 1/1999 |
| JP | 11/233010 | | 8/1999 |
| JP | 2000-011898 A | * | 1/2000 |
| JP | 2001-26477 | | 1/2001 |

OTHER PUBLICATIONS

U.S. Appl. No. 09/390,795, filed Sep. 7, 1999, Iguchi et al.
U.S. Appl. No. 09/448,468, filed Nov. 24, 1999, Iguchi et al.
U.S. Appl. No. 09/861,680, filed May 22, 2002, Uegaki et al.

* cited by examiner

*Primary Examiner*—John A. McPherson
(74) *Attorney, Agent, or Firm*—Morrison & Foerster LLP

(57) ABSTRACT

A dielectric paste of the present invention contains a binder resin, a cross-linking agent, a thermal polymerization initiator, and an inorganic powder, wherein the content of the thermal polymerization initiator is 3 to 30 parts by weight to 100 parts by weight of the total of the binder resin and the cross-linking agent. A method of manufacturing a plasma display, of the present invention, includes a first step of forming electrode patterns using an electrode paste, a second step of forming a dielectric paste coating film using a dielectric paste, a third step of forming barrier rib patterns using a barrier rib paste, a subsequent step of simultaneously firing at least the electrode patterns, the dielectric paste coating film, and the barrier rib patterns, and a step of performing curing after the second step. The present invention provides a method of manufacturing a plasma display, in which the electrode patterns, the dielectric paste coating film, and the barrier rib patterns can be simultaneously fired without any defects such as disconnections or cracks.

7 Claims, 3 Drawing Sheets

DIELECTRIC PASTE AND MANUFACTURING METHOD OF PLASMA DISPLAY

BACKGROUND OF THE INVENTION

1. Field of the Invention

The present invention relates to dielectric pastes and manufacturing methods of plasma displays.

2. Description of the Related Art

In recent years, plasma displays have drawn attention as next generation large-sized displays, and hence techniques for reliably producing a highly fine plasma display at reasonable cost have been desired. Among members constituting plasma display mentioned above, one of quite high cost members is a back panel.

As shown in FIG. 1, the back panel is formed of at least electrodes 1, a dielectric layer 2, stripe shaped barrier ribs 3, and fluorescent layers 4 of R, G, and B, which are all formed on a substrate. In addition, recently, as shown in FIG. 2, grid shaped barrier ribs has also been frequently formed in which there are provided main barrier ribs 6 in a stripe shape and sub-barrier ribs 7 formed in the direction perpendicular thereto. In the back panel having any one of the barrier rib structures mentioned above, when a photosensitive paste method is used for forming electrode patterns and barrier rib patterns, it has become possible to reliably produce highly fine back panels; however, it has been still desired that the cost be further decreased.

Heretofore, in a process for manufacturing a back panel, steps of forming electrode patterns, a dielectric paste coating film, barrier rib patterns, and phosphor patterns have been performed, and materials used in the steps described above are separately fired after the respective steps (see FIG. 3). That is, in the process for manufacturing the back panel, at least four firing steps must be performed, and hence the productivity is low, resulting in an increase in cost. In addition, since a number of firing steps must be performed, a problem has occurred in that dimensional change of glass substrate is increased by repeated application of heat. Furthermore, when silver is used for forming electrodes, the silver migrates increasingly due to a number of firing steps, and hence this migration becomes partly responsible for a decrease in reliability of panels.

Accordingly, studies have been made on a simultaneous firing process for simultaneously firing some of the electrode patterns, dielectric paste coating film, barrier rib patterns, and phosphor patterns. For example, in Japanese Unexamined Patent Application Publication No. 11-7894, a simultaneous firing process has been disclosed in which, by increasing processing temperatures of inorganic powder used in electrodes, a dielectric layer, barrier ribs, and phosphors in that order, four members, that is, the electrodes patterns, dielectric paste coating film, barrier rib patterns, and phosphor patterns, are fired simultaneously. However, when the method described above is used, there have been serious two problems.

The first problem is that when the barrier rib patterns are formed by a photosensitive paste method or sand blast method, electrode lead wire portions 5, which are not covered with the dielectric paste coating film, of the electrode patterns are eroded by a developing solution for the barrier ribs or by polishing particles, and as a result, the electrode lead wire portions 5 are peeled off.

The second problem is that when the electrode patterns, dielectric paste coating film, and barrier rib patterns are simultaneously fired, large firing stresses are generated in both the electrode patterns and the barrier rib patterns in the direction so as to tear the dielectric layer, resulting in the generation of defects, such as disconnections of the electrode patterns or cracks formed in the dielectric layer.

In Japanese Unexamined Patent Application Publication No. 2001-26477, in the case in which two layers, i.e., the dielectric paste coating film and barrier rib patterns, are simultaneously fired, a manufacturing method has been disclosed in which the dielectric paste coating film is cured beforehand by heat so that cracks are not formed therein even when a firing stress is generated in the barrier rib in the simultaneous firing. However, in the case in which the electrode patterns, dielectric paste coating film, and barrier rib patterns are simultaneously fired, since a larger firing stress is generated, even when this manufacturing method is used, there has been a problem in that cracks are formed in the dielectric layer.

SUMMARY OF THE INVENTION

Accordingly, an object of the present invention is to provide a dielectric paste for forming a dielectric paste coating film which can be simultaneously fired together with electrode patterns and barrier rib patterns without any defects such as disconnection and cracks, and is to provide a manufacturing method of a plasma display.

The present invention has the following structure in order to solve the problems of conventional techniques described above. That is, the dielectric paste of the present invention contains at least a binder resin, a cross-linking agent, a thermal polymerization initiator, and an inorganic powder, wherein the content of the thermal polymerization initiator is 3 to 30 parts by weight to 100 parts by weight of the total of the binder resin and the cross-linking agent.

In addition, the method of manufacturing a plasma display, according to the present invention, comprises a first step of forming electrode patterns using an electrode paste, a second step of forming a dielectric paste coating film using a dielectric paste, a third step of forming barrier rib patterns using a barrier rib paste, a subsequent step of simultaneously firing at least the electrode patterns, the dielectric paste coating film, and the barrier rib patterns, and a step of performing curing after the second step

DESCRIPTION OF THE PREFERRED EMBODIMENTS

Hereinafter, the present invention will be described in accordance with sequential steps for manufacturing a plasma display.

Figure 1:
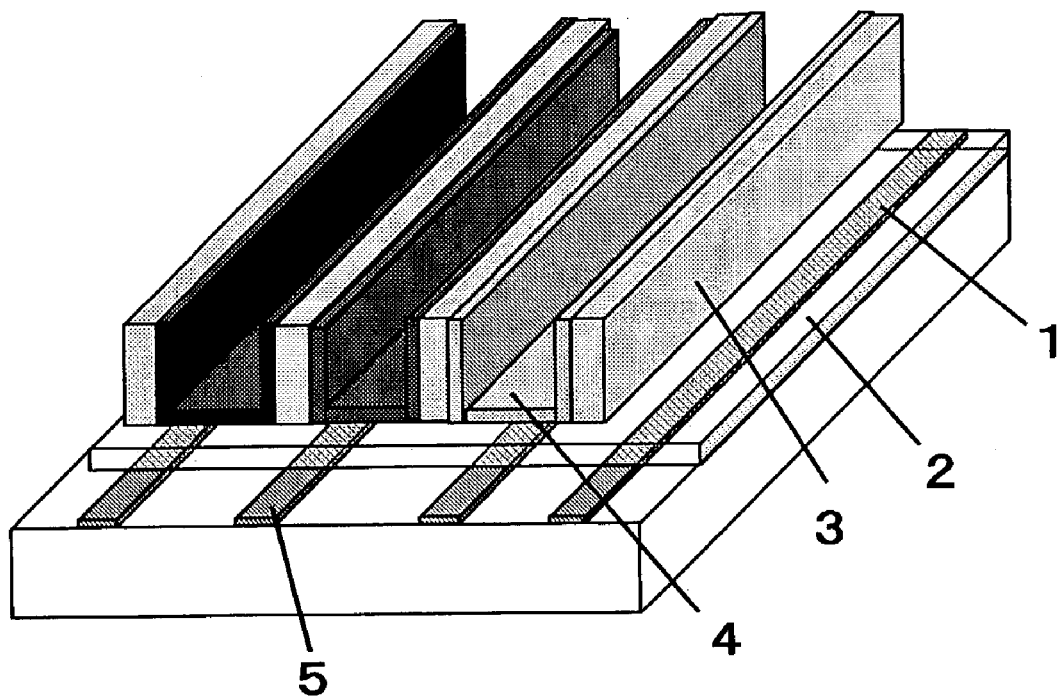
FIG. 1 is an exploded perspective view of a plasma display back panel having stripe shaped barrier ribs.
Figure 2:
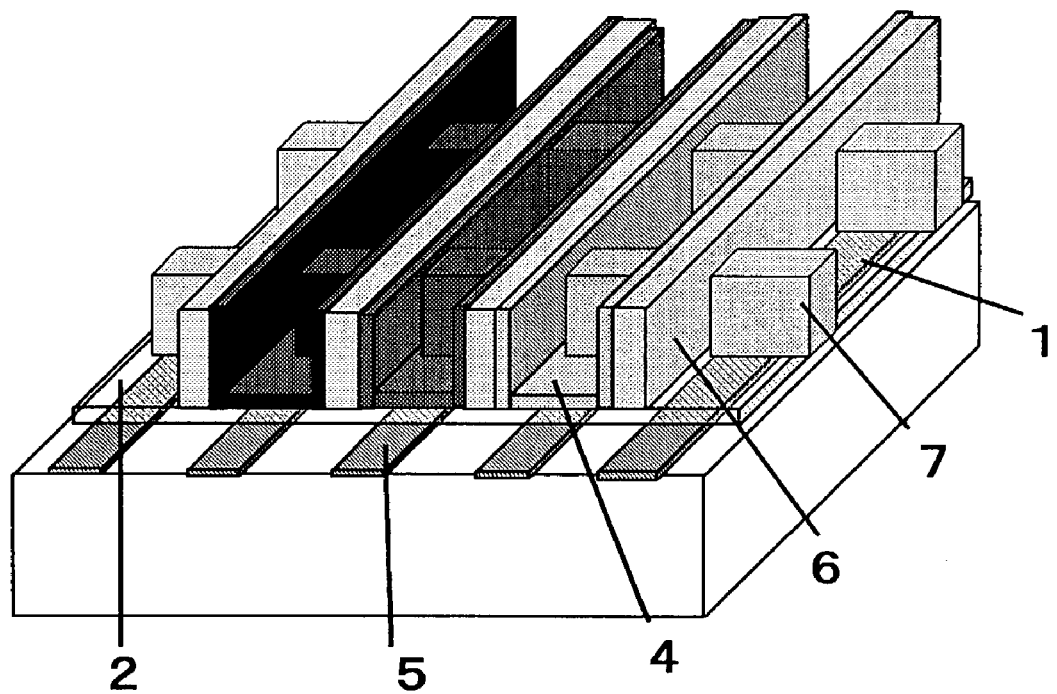
FIG. 2 is an exploded perspective view of a plasma display back panel having grid shaped barrier ribs.
Figure 3:
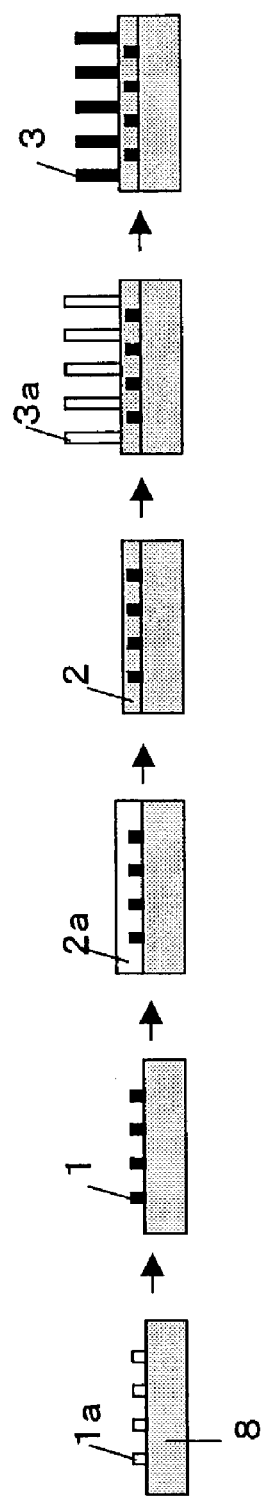
FIG. 3 shows steps for illustrating a conventional manufacturing process.
Figure 4:
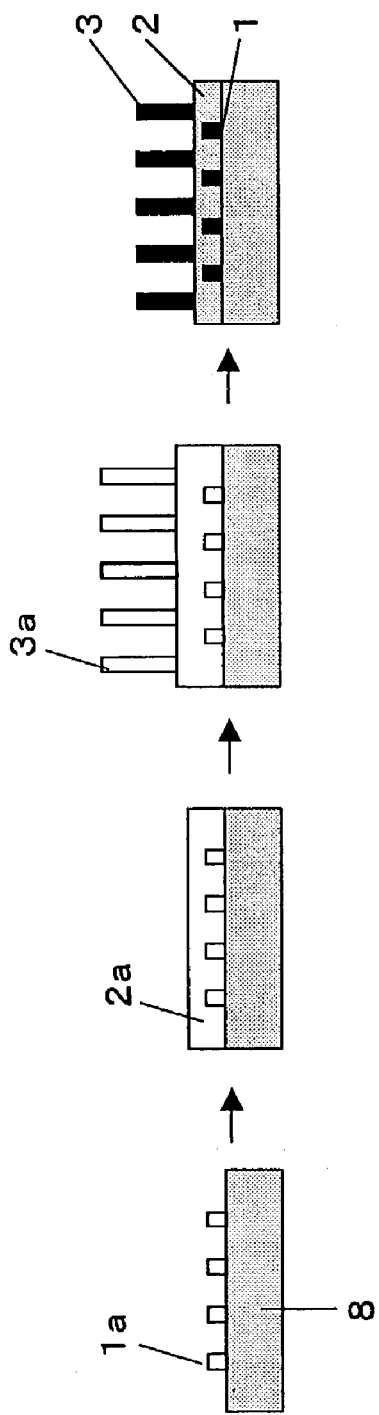
FIG. 4 shows steps for illustrating a manufacturing process of the present invention.

FIG. 4 shows an example of a process for manufacturing a plasma display. Electrode patterns 1a having a desired shape are formed on a substrate using an electrode paste. A dielectric paste coating film 2a is formed using a dielectric paste on the substrate provided with the electrode patterns 1a. Barrier rib patterns 3a are formed using a barrier rib paste on the dielectric paste coating film 2a. In addition, the electrode patterns 1a, the dielectric paste coating film 2a, and the barrier rib patterns 3a are simultaneously fired together with the substrate, thereby forming electrodes 1, a dielectric layer 2, and barrier ribs 3. Hereafter, each step mentioned above will be described in detail.

As a back panel substrate for use in plasma displays, a glass substrate formed of a soda glass or a high strain point glass, such as "PD-200" manufactured by Asahi Glass Co., Ltd. or "PP-8" manufactured by Nippon Electric Glass Co., Ltd. has been generally used.

The electrode patterns are formed on the substrate using an electrode paste containing a conductive metal and a binder. For this formation of the electrode patterns, a screen printing method, photosensitive paste method, press molding method, or the like may be used. Since highly fine patterns can be formed and the process can be simplified, a photosensitive paste method is particularly preferable. Hereafter, steps of a photosensitive paste method will be described.

A photosensitive electrode paste is applied to the entire substrate surface of the substrate or to a part thereof. As a coating method, for example, preferably used is screen printing, bar coating, roller coating, die coating, or blade coating. The coating thickness is optionally adjusted by selecting the number of applications, mesh size of screen, and viscosity and coating amount of the paste. The coating thickness may be determined in consideration of a desired height of the electrode and shrinkage rate of the electrode paste after firing. A generally preferable electrode height after firing is in the range from 1 to 10 µm, and when the shrinkage rate after firing is taken into consideration, the thickness of a coating film of the electrode paste is preferably in the range from 1 to 15 µm.

The photosensitive electrode paste thus applied is dried and then exposed. As active light used for this exposure, UV light is most preferable, and as a light source therefor, for example, generally used are a low pressure mercury lamp, high pressure mercury lamp, ultra high-pressure mercury lamp, and halogen lamp. As an aligner, generally used is an aligner using parallel light beams and having an ultra high-pressure mercury lamp as a light source.

After exposure, by using the difference in solubility of an exposed part and a non-exposed part in a developing solution, development is performed, thereby forming the electrode patterns. For development, a dipping method, spray method, brush method, or the like may be Used. As the developing solution, for example, a preferably used is a solution capable of dissolving an organic component of the photosensitive electrode paste, and particularly, a polymer component.

The formation of the electrode patterns may be performed in consideration of the shrinkage after firing. The electrode formed by firing preferably has a pitch of 100 to 500 µm, a height of 1 to 10 µm, and a width of 15 to 400 µm. More preferably, it has a pitch of 100 to 250 µm, a height of 1 to 10 µm, and a width of 15 to 60 µm.

In addition, after the electrode patterns are formed, it is preferable that the electrode pattern curing step is performed. As the conditions for the electrode pattern curing step, a temperature in the range of 140 to 300° C. and a time in the range of 3 to 30 minutes are preferable. More preferable the temperature and time are 150 to 250° C. and 5 to 30 minutes, respectively. In the present invention, the curing does not include mere drying performed at approximately 120° C. or less. For curing, a hot air dryer or an IR dryer may be used.

Since adhesion of the electrode patterns to the substrate is degraded due to erosion thereof caused by a developing solution, edge curling in which the side of the pattern is peeled from the substrate may occur in some cases. When the edge curling occurs, there may be problems in that the thickness of the dielectric paste coating film varies, or that a firing stress of the electrode is increased. After the electrode patterns are formed, when curing is performed at 140° C. or more, a polymer is put in a flexible state for a while, thereby suppressing the edge curling. In addition, since a solvent remaining at the electrode lead portions can be substantially removed, even when a photosensitive paste method or a sand blast method is used in a subsequent step of forming the barrier ribs, resistance characteristics can be imparted to the electrode lead potions so as not to be removed by a developing solution for the barrier ribs or by polishing particles. In addition, by performing the curing at a temperature of 300° C. or less, thermal shrinkage of the electrode patterns can be reduced, and hence the edge curling caused by the shrinkage can be suppressed. The electrode patterns are preferably cured before the dielectric paste is applied. By forming the dielectric layer on the electrodes having small edge curling, problems of decrease in withstand voltage or the like caused by variation in thickness of the dielectric layer can be suppressed.

Next, for forming the dielectric layer, the dielectric paste is applied to the entire surface of the substrate or a part thereof. In addition to effects of protecting and insulating the electrodes formed on the substrate, the dielectric layer covering the electrodes has an effect of improving the formability of the barrier ribs to be provided thereon.

The dielectric paste used in the present invention includes at least a binder resin, a cross-linking agent, a thermal polymerization initiator, and an inorganic powder. As the binder resins, for example, there may be mentioned poly (vinyl butyral), poly(vinyl acetate), poly(vinyl alcohol), polyethylene, silicone polymers (such as poly(methyl siloxane) and poly(methylphenyl siloxane), polystyrene, butadiene-styrene copolymer, poly(vinyl pyrrolidone), polyamide, high molecular weight polyether, copolymer of ethylene oxide and propylene oxide, poly(acryl amide), various acrylic polymers, and cellulose compounds. Acrylic polymers or cellulose compounds are preferably used since firing residues formed during firing can be reduced.

As the acrylic polymers, for example, preferably used is a homopolymer or a copolymer of (meth)acrylic acid or an alkyl (meth)acrylate, and an optional acrylate polymer may be selected so as to impart preferable characteristics to the paste. In particular, for example, preferably used are homopolymers, such as poly(acrylic acid), poly(methacrylic acid), poly(methyl acrylate), poly(ethyl acrylate), poly(methyl methacrylate), poly(ethyl methacrylate), poly(propyl methacrylate), poly(butyl methacrylate), and poly(hexyl methacrylate); and copolymers formed by the combination of the monomers constituting the homopolymers mentioned above. As the cellulose compounds, for example, preferably used are methyl cellulose, ethyl cellulose, hydroxy cellulose, and hydroxymethyl cellulose.

The dielectric paste of the present invention forms a three-dimensional network structure by a cross-linking agent using radicals generated from the thermal polymerization initiator, the radicals functioning as reaction initiation. Accordingly, resistance against a developing solution used in a subsequent step is improved, and generation of cracks and disconnections during firing caused by firing stresses can be suppressed. In this step, in order to form a three-dimensional network structure, it is preferable that the cross-linking agent be a compound having at least three reactive functional groups. As the compounds mentioned above, for example, compounds having active carbon-carbon double bonds, such as vinyl, acrylic, (meth)acrylate, and acryl amide groups, are suitably used. Since various types of (meth)acrylic compounds have been developed, in consideration of reactivity, refractive index, and the like, one or at least two in combination may be selected among those (meth)acrylic compounds. In addition, a method for introducing a side chain having a carbon-carbon double bond to a main polymer chain is also preferably performed.

As the (meth)acrylate compounds, acrylic compounds or methacrylic compounds having alkyl groups shown by formulas (2), (3), (4), and (5) are preferably used. Among those mentioned above, since having at least three functional groups, the compound represented by formula (5) is particularly preferably.

$$CH_2=CR^3COO\text{---}R^4 \tag{2}$$

$$CH_2=CR^3COO\text{---}R^4\text{---}OCOCR^3=CH_2 \tag{3}$$

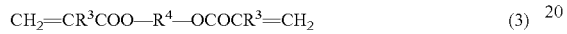

$$CH_2=CR^3COO\text{---}R^5\text{---}OCO\text{---}R^4\text{---}COO\text{---}R^5\text{---}$$
$$OCOCR^3=CH_2 \tag{4}$$

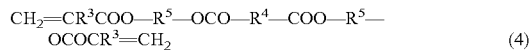

$$(CH_2=CR^3COO\text{---}(CH_2CHR^6O)_m)_n\text{---}R^7 \tag{5}$$

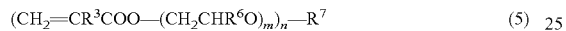

In those formulas, $R^3$ and $R^6$ indicate hydrogen or methyl group; $R^4$ indicates alkyl group or alkylene group having 1 to 20 carbon atoms; $R^5$ indicates alkylene group having at least three carbon atoms; $R^7$ indicates aliphatic group or aromatic group having 1 to 20 carbon atoms; m is an integer of 0 to 30; and n is an integer of 3 to 6.

As the particular examples of the compounds represented by formula (5), for example, there may be mentioned trimethylolpropane tri(meth)acrylate, ethoxide trimethylolpropane tri(meth)acrylate, propoxide trimethylolpropane tri(meth)acrylate, pentaerythritol tri(meth)acrylate, propoxide glyceryl tri(meth)acrylate, pentaerythritol tetra(meth)acrylate, ditrimetehylolpropane tetra(meth)acrylate, dipentaerythritol hydroxy penta(meth)acrylate, and alkylene oxide modified compounds thereof. However, the compounds represented by formula (5) are not limited to those mentioned above.

The amount of the cross-linking agent is preferably controlled so that a ratio of the binder resin to the cross-linking agent is set in the range of from 60/40 to 5/95 on a weight basis. When the content of the cross-linking agent is set in the range described above, strength of the dielectric paste coating film can be maintained, and in addition, firing residues after firing can be reduced. The ratio on a weight basis between the above two is more preferably in the range of from 20/80 to 5/95.

In the dielectric paste of the present invention, the content of the thermal polymerization initiator is 3 to 30 parts by weight to 100 parts by weight of the total of the binder resin and the cross-linking agent. More preferably, the content is in the range of 5 to 30 parts by weight, and even more preferably, in the range of 10 to 30 parts by weight. In general, a thermal polymerization initiator generates active radicals by heat and can initiate reaction of a cross-linking agent. The content of the thermal polymerization initiator is quite high as compared to that of a general thermal polymerization initiator. In the dielectric paste of the present invention, the content of the thermal polymerization initiator is set in the range as described above so that the cross-linking agent is allowed to sufficiently react in the paste coating film, which is a system having lesser degree of freedom, thereby forming the three-dimensional network structure. Accordingly, the strength of the dielectric paste coating film is increased, and even when shrinkage stresses are generated during a-subsequent firing step, the generation of defects, such as disconnections of the electrodes and cracks formed in the dielectric layer, can be suppressed.

The thermal polymerization initiator generates radicals as shown in formula (6) below, thereby initiating a starting reaction as shown in formula (7) below.

Formula (6)

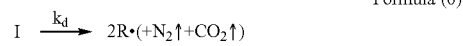

$$I \xrightarrow{k_d} 2R\cdot(+N_2\uparrow+CO_2\uparrow)$$

In formula (6), I indicates the initiator, R. indicates a primary radical generated from the initiator, and $k_d$ indicates a kinetic constant.

$$R.+M\text{-->}M. \tag{Formula (7)}$$

In formula (7), M indicates the cross-linking agent, and M. indicates a radical of the cross-linking agent.

In the reactions shown above, every primary radical generated in accordance with formula (6) is not always allowed to react with the cross-linking agent for initiating the starting reaction. The primary radicals thus generated recombine each other with a high probability before being sufficiently apart from each other. That is, the primary radicals, which can be sufficiently apart from each other, are only allowed to react with the cross-linking agent.

The ratio of the primary radicals involved in the starting reaction shown in formula (7) is called "initiator efficiency". That is, the initiator efficiency can be represented by formula (8) below.

$$\text{Initiator Efficiency}=R_i/2k_d[I] \tag{Formula (8)}$$

In formula (8), $k_d$ indicates the kinetic constant of formula (6), $R_i$ indicates an initial rate of formula (7), and the [I] indicates the concentration of the initiator.

The initiator efficiency of the thermal polymerization initiator of the present invention is preferably in the range of 0.8 to 1.0. In this embodiment, the value of the initiator efficiency is a value in benzene at 60° C. for a starting reaction for polystyrene formation. In the present invention, since the thermal polymerization initiator is dissociated in the paste coating film, that is, in a system having lesser degree of freedom, it is difficult for the primary radicals generated by dissociation to diffuse so as not to recombine each other. Accordingly, when a thermal polymerization initiator having a low initiator efficiency is used, deactivation is likely to occur by reaction between the primary radicals, and as a result, it is hard for the cross-linking agent to satisfactory form a three-dimensional network by cross-linking. When the initiator efficiency of the thermal polymerization initiator is 0.8 or more, deactivation of the primary radicals generated from the thermal polymerization initiator can be prevented, and the cross-linking agent is allowed to sufficiently react, thereby increasing the strength of the dielectric paste coating film.

As the thermal polymerization initiators, organic peroxides or azo compounds may be mentioned by way of example. As the organic peroxides, for example, there may be mentioned dibutyl peroxydicarbonate, di(2-ethoxyethyl) peroxydicarbonate, di(2-ethylhexyl)peroxydicarbonate, t-butyl peroxyneodecanoate, 2,4-dichlorobenzoyl peroxide, 3,5,5-trimethylhexanoyl peroxide, octanoyl peroxide, decanoyl peroxide, lauroyl peroxide, t-butylperoxy(2-ethylhexanoate), benzoyl peroxide, t-butylperoxyisobutylate, 1,1-bis(t-butylperoxy)-3,3,5-trimethyl cyclohexane, t-butylperoxylaurylate, t-butylperoxy-3,3,5-trimethyl hexanoate, cyclohexane peroxide, t-butylperoxyacetate, 2,2-bis(t-butylperoxy)-butane, t-butylperoxybenzoate, di-t-butylperoxy isophthalate, methylethyl ketone peroxide, dicumyl peroxide, 2,5-dimethyl-2,5-di(t-butylperoxy)hexane, t-butylcumyl peroxide, and di-t-butyl peroxide. As the azo compounds, for example, there may be mentioned 2,2-azobis(2,4-dimethyl valeronitrile), 2,2-azobis(isobutylonitrile), 2,2-azobis(2-methyl butylonitrile), 1,1-azobis(cyclhexane-1-carbonitrile), 1-((1-cyano-1-methylethyl)azo) formamdie(2-(carbamoylazo)isobutylonotrile), 2,2'-azobis(2-methyl-N-(1,1-bis(hydroxymethyl)-2-hydroxmethyl) propionic amide), 2,2'-azobis(2-methyl-N-(2-(1-hydroxybutyl)propionic amide), and 2,2'-azobis(2-methyl-N-(2-hydroxyethyl)propionic amide).

As the thermal polymerization initiator used in the present invention, an organic peroxide is preferable since the initiator efficiency thereof is high. In azo compounds, chemical bonds at both sides of the azo group are simultaneously broken, two radicals are generated thereby, a pair of the radicals thus generated releases nitrogen within $10^{-9}$ seconds after its generation, and as a result, a stable compound is formed through recombination or disproportionation. Accordingly, since the initiator efficiency of the azo compound becomes low, it is not preferable. For example, azobis(isobutylonitrile) has an initiator efficiency of 0.6 to 0.7. In addition, some peroxides release carbon dioxide, and as a result, the initiator efficiencies thereof also become low as is the azo compound.

Among the organic peroxides, a compound having the benzoyl structure is more preferable. Since benzoyloxy radicals generated by dissociation of an organic peroxide having the benzoyl structure are unlikely to release carbon dioxide, and even when recombination of the radicals occurs, since the dissociation again occurs, a high initiator efficiency can be obtained. For example, the initiator efficiency of benzoyl peroxide is approximately 1.0.

A particularly preferable compound is represented by formula (1) below.

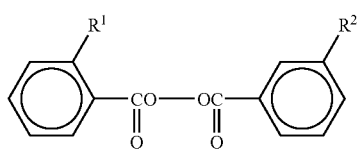

Formula (1)

In formula (1), $R^1$ and $R^2$ each indicate hydrogen, alkyl group having 1 to 5 carbon atoms, or aralkyl group.

In the compound represented by formula (1), it is not preferable that both $R^1$ and $R^2$ be hydrogen at the same time. Since an asymmetric compound having the structure as shown above has extremely high solubility in an organic solvent, a highly concentrated solution thereof can even be used. In addition, even when being stored for a long period of time, problems in that the initiator precipitates or is deactivated will not occur. In the present invention, at least one compound among the thermal polymerization initiators mentioned above may be used.

The dielectric paste of the present invention preferably further comprises a urethane compound. When a urethane compound is contained, flexibility of the dielectric paste coating film is improved, and stress generated during firing can be decreased, thereby effectively suppressing the generation of defects such as cracks or disconnection. In addition, when a urethane compound is contained, thermal decomposition ability is improved, and firing residues are unlikely to be generated in a firing step. As a urethane compound preferably used in the present invention, for example, a compound represented by general formula (9) below may be mentioned.

$$R^8-(R^{11}-R^{10})_n-R^{11}-R^9 \qquad \text{Formula (9)}$$

In this formula, $R^8$ and $R^9$ each indicate a substituent containing an ethylenic unsaturated group, hydrogen, alkyl group having 1 to 20 carbon atoms, aryl group, aralkyl group, or hydroxyaralkyl group, and they may be the same or different. $R^{10}$ indicates an alkylene oxide group or alkylene oxide oligomer, and $R^{11}$ indicates an organic group having a urethane bond. In addition, n is a positive integer of 1 to 10.

As the urethane compound described above, a compound containing ethylene oxide units is preferable. More preferably used is an oligomer represented by formula (9) in which $R^{10}$ contains ethylene oxide units (hereinafter referred to as EO) and propylene oxide units (hereinafter referred to as PO), and in which the EO content in the oligomer is in the range of from 8 to 70 wt %. When the EO content is 70 wt % or less, the flexibility is further improved, and the firing stress can be decreased, thereby effectively suppressing the generation of defects. In addition, the thermal decomposition ability is improved, and hence firing residues are unlikely to be generated in a subsequent firing step. In addition, when the EO content is 8% or more, the solubility in another organic component is improved.

The urethane compound preferably has a carbon-carbon double bond. Since the urethane having a carbon-carbon double bond is incorporated in a cross-linked structure by reaction between the double bond of the urethane compound and the carbon-carbon double bond of the cross-linking agent, the shrinkage caused by polymerization can be suppressed.

As particular examples of the urethane compounds preferably used in the present invention, for example, there may be mentioned UA-2235PE (molecular weight of 18,000, EO content of 20%), UA-3238PE (molecular weight of 19,000, EO content of 10%), UA-3348PE (molecular weight of 22,000, EO content of 15%), and UA-5348PE (molecular weight of 39,000, EO content of 23%) (those are manufactured by Shin-Nakamura Chemical Co., Ltd.). However, the urethane compounds are not limited thereto. In addition, a mixture of the compounds mentioned above may be used.

The content of the urethane compound is preferably 0.1 to 20 wt % of the dielectric paste. When the content is set to 0.1% or more, the flexibility of the dielectric paste coating film can be improved. When the content is more than 20 wt %, since dispersibilities of the organic component and the inorganic powder are degraded, and the contents of the cross-linking agent and the thermal polymerization initiator are relatively decreased, the defects are likely to occur.

The dielectric paste of the present invention preferably contains glass powder (hereinafter referred to as "low-melting-point glass powder") having a softening point of 450 to 600° C. When the low-melting-point glass powder has a softening point of 600° C. or less, high temperature sintering is not necessary to perform, and hence the glass substrate is not distorted during firing. In addition, when the softening point is 450° C. or more, the dielectric layer is not distorted in a phosphor layer-forming step and sealing step, which are subsequently performed, and hence the film thickness accuracy can also be maintained. The softening point of the low-melting-point glass powder is more preferably in the range of from 470 to 550° C.

The content of the low-melting-point glass powder is preferably in the range of from 150 to 300 parts by weight to 100 parts by weight of the total of the binder resin and the cross-linking agent. When the content of the low-melting-point glass powder is set to 150 parts by weight or more, a compact dielectric layer can be obtained. In addition, since the content of the organic component is relatively decreased, firing residues are decreased in firing. When the content of the low-melting-point glass powder is set to 300 parts by weight or less, an excessive decrease of the content of the organic component is prevented, the three-dimensional network structure formed by the cross-linking agent can be sufficiently dense, and the formation of cracks in the dielectric layer during firing can be suppressed.

The low-melting-point glass powder in the inorganic powder mixed in the dielectric paste preferably contains the following materials in the form of oxide.

| | |
|---|---|
| Bismuth oxide | 10 to 85 wt % |
| Silicon oxide | 3 to 50 wt % |
| Boron oxide | 5 to 40 wt % |
| Zinc oxide | 4 to 40 wt % |

When the low-melting-point glass powder has the composition described above, a dielectric paste which can be fired on a glass substrate at a temperature of 520 to 580° C.

The content of the bismuth oxide in the low-melting-point glass powder is preferably in the range of from 10 to 85 wt %. When the content is set to 10 wt % or more, an effect of controlling a firing temperature and a softening point can be obtained, and when the content is set to 85 wt % or less, an excessive decrease in heat resistance temperature of the glass can be prevented, and hence firing on the glass substrate can be appropriately performed.

The content of the silicon oxide is preferably in the range of from 3 to 50 wt %. When the content is set to 3 wt % or more, the compactness, strength, and stability of the glass layer can be improved, and since the coefficient of thermal expansion becomes similar to that of the glass substrate, incompatibility with the glass substrate can be avoided. When the content is set to 50 wt % or less, the softening point or glass transition temperature is decreased, and the dielectric paste can be compactly fired on the glass substrate at a temperature of 580° C. or less.

When the boron oxide is blended at a content of 5 to 40 wt %, electrical, mechanical, and thermal properties, such as electrical insulation, strength, coefficient of thermal expansion, and compactness can be improved.

The content of the zinc oxide is preferably in the range of from 4 to 40 wt %. When the content is set to 4 wt % or more, an effect of increasing the compactness can be obtained, and when the content is set to 40 wt % or less, the case in which control cannot be performed because of excessive decrease in firing temperature can be avoided, and in addition, the insulating resistance can be maintained.

It is preferable that the glass components described above contain no substantial alkali metals. The reason for this is to avoid a problem of yellowish coloration. Since the dielectric layer is formed in many cases while being in contact with a silver electrode or a glass substrate, a problem of yellowish coloration caused by ion exchange reaction with silver ions of the silver electrode or components of the glass substrate may occur in some cases. "No substantial alkali metal" particularly means that the total content of alkali metals in the glass component is 0.5 wt % or less, and more preferably, 0.1 wt % or less.

In addition, the dielectric paste of the present invention preferably contains 50 to 200 parts by weight of a filler having a softening point of 650° C. or more to 100 parts by weight of the total of the binder resin and the cross-linking agent. The reason for this is that when the filler having a softening point of 650° C. or more is added, for example, effects of decreasing the shrinkage rate after firing and decreasing a stress applied to the substrate can be obtained. In addition, by selecting a filler having particular properties, film properties, such as reflectance, and conductivity, of the dielectric layer can be controlled.

When 50 parts by weight or more of a filler having a softening point of 650° C. or more is added for example, an effect of decreasing the shrinkage rate after firing or controlling a coefficient of thermal expansion can be obtained. In addition, when the content is set to 200 parts by weight or less, the compactness and strength of the dielectric layer after firing can be maintained, and at the same time, defects such as cracks formed in the dielectric layer can be avoided.

As the filler having a softening point of 650° C. or more, preferably used is at least one selected from the group consisting of a high melting point glass having a softening point of 650 to 850° C., titanium oxide, aluminum oxide, silicon oxide, barium titanate, and zirconium oxide.

In addition, the dielectric paste of the present invention preferably contains conductive powder. In an AC plasma display, space charges are generated when plasma discharge is performed between a display electrode and an address electrode, and most of the space charges are stored on a dielectric layer formed on the display electrode. Discharge caused by a voltage due to the charges thus stored incidentally occurs, thereby degrading the image quality. In order to dissolve the storage of the charges causing the degradation of the image quality, a conductive powder mixed in the dielectric layer effectively allows the stored charges to leak. As the conductive powder, in particular, preferably used is a metal powder such as chromium or nickel, or a semiconductor formed of a metal oxide, such as indium oxide, tin oxide, or titanium oxide, mixed with an impurity. The content of the conductive powder is preferably in the range of from 0.1 to 5 parts by weight to 100 parts by weight of the total of the binder resin and the cross-linking agent. When the content is set to 0.1 parts by weight or more, the charges are allowed to leak efficiently, and hence incidental discharge can be avoided. When the content is set to 5 parts by weight or less, the compactness of the dielectric layer can be maintained.

The dielectric paste has a form in which an inorganic powder is dispersed in an organic component, and in order to obtain superior coating properties, it is preferable that the inorganic powder be uniformly dispersed in the organic component. For forming a paste as described above, the average particle diameter, maximum particle diameter, tap density, and the like are preferably in an appropriate range.

The inorganic powder preferably has an average particle diameter of 0.2 to 1.5 μm, a maximum particle diameter of 10 μm or less, and a tap density of 0.6 g/cm$^3$ or more. An inorganic powder having particle diameters and a tap density, which are within the ranges described above, has superior dispersibility and filling properties in the paste, and hence a paste having superior coating properties can be obtained. In the present invention, the particle diameters are measured by a laser scattering diffraction method, the average particle diameter is 50% volume particle diameter, and the maximum diameter is the maximum value of the particle diameter.

Since agglomeration force of particles depends on surface area thereof, when the average particle diameter is set to 0.2 µm or more, the agglomeration can be suppressed, the dispersibility in the paste is improved, and hence a compact and uniform coating film can be obtained. In addition, when the average particle diameter is set to 1.5 µm or less, the compactness of the formed dielectric paste coating film is improved, and voids are not formed inside. In addition, unnecessary irregularities on the surface of the coating film are not formed. When the maximum particle diameter is set to 10 µm or less, the formation of voids inside the film and unnecessary irregularities on the surface thereof can also be avoided.

When the tap density of the inorganic powder is set to 0.6 $g/cm^3$ or more, and more preferably, 0.7 $g/cm^3$ or more, the filling properties and dispersibility are improved, and voids and agglomerated materials are unlikely to be formed.

In addition to the materials described above, whenever necessary, the dielectric paste of the present invention may contain a dispersing agent, stabilizer, antifoaming agent, leveling agent, silane coupling agent, antioxidant, polymerization inhibitor, organic solvent, or the like.

Since a uniform and compact dielectric layer can be formed, the thickness of the dielectric layer is preferably in the range of from 4 to 18 µm after firing, and more preferably, from 8 to 15 µm. When the thickness is set to 18 µm or less, binder-removing ability becomes superior during firing, and cracks caused by a remaining binder are not formed. In addition, a stress applied to the glass substrate is decreased, problems of substrate warping and the like may not arise. When the thickness is set to 4 µm or more, a flat, uniform, and compact dielectric layer can be formed, and hence cracks are not formed in the dielectric layer caused by indentation of the electrode.

After the dielectric paste coating film is formed, curing is performed. The reason for this is that when curing is performed prior to a firing step, the dielectric paste coating film becomes able to withstand stresses generated by shrinkage of the electrode patterns and the barrier rib patterns during the subsequent firing step. Curing may be performed prior to the firing step and is preferably performed before a barrier paste is applied. By the curing step, since a remaining solvent at the electrode lead portions is totally removed, resistance of the electrode lead portions is improved, and in a subsequent step of forming the barrier rib patterns, the electrode lead portions are not easily removed by a developing solution for the barrier rib or polishing particles.

As the conditions for curing the dielectric paste coating film, a temperature in the range of 140 to 300° C. and a time in the range of 3 to 30 minutes are preferable. More preferably, the temperature is in the range of 150 to 250° C. and the time is in the range of 5 to 30 minutes. The curing of the present invention does not mean mere drying performed at approximately 120° C. or less. That is, by curing the coating film at the temperature for the time described above after the dielectric paste is applied, a problem may not arise in that cracks are formed in the dielectric layer in a subsequent firing step due to insufficient curing of the coating film. The curing may be performed using a hot air dryer or an IR dryer.

Next, the barrier rib patterns are formed. The formation of the barrier rib patterns may be performed by a screen printing method, sand blast method, photosensitive paste method, press molding method, or the like. Since highly fine patterns can be formed and a process can be simplified, a photosensitive paste method is particularly preferable. Hereafter, steps of a photosensitive paste method will be described.

A photosensitive barrier rib paste is applied onto the entire surface of the dielectric paste coating film or onto a part thereof. As a method for applying the photosensitive paste, for example, a general method, such as screen printing, bar coating, roller coating, or doctor blade coating, is performed. The coating thickness may be determined in consideration of a desired height of the barrier rib and shrinkage rate of the barrier rib paste after firing. In general, a preferable barrier rib height after firing is in the range from 60 to 170 µm, and when the shrinkage rate after firing is taken into consideration, the thickness of a coating film of the barrier rib paste is preferably in the range from 80 to 220 µm.

The photosensitive barrier rib paste thus applied is dried and then exposed. Active light used for the exposure is most preferably UV light, and as a light source therefor, for example, preferably used are a low pressure mercury lamp, high pressure mercury lamp, ultra high-pressure mercury lamp, and halogen lamp. As an aligner, generally used is an aligner using parallel light beams and having a ultra high-pressure mercury lamp as a light source.

After exposure, by using the difference in solubility of an exposed part and a non-exposed part in a developing solution, development is performed, thereby forming the barrier rib patterns. For development, a dipping method, spray method, brush method, or the like may be used. As the developing solution, for example, a preferably used is a solution capable of dissolving an organic component in the photosensitive barrier rib paste, and particularly, a polymer component. In the present invention, development is preferably performed using an alkaline aqueous solution. The formation of the barrier rib patterns may be performed in consideration of the shrinkage rate after firing. The barrier rib formed after firing preferably has a pitch of 100 to 500 µm, a height of 60 to 170 µm, and a width of 15 to 80 µm. More preferably, it has a pitch of 200 to 400 µm, a height of 80 to 140 µm, and a width of 25 to 45 µm. The barrier rib patterns are generally formed in a stripe shape, but are not limited thereto. For example, a grid shape may also be formed. When the back panel having the grid shaped barrier ribs is formed by using the dielectric paste of the present invention, cracks may also not be formed in the dielectric layer.

After the barrier rib patterns are formed, the electrode patterns, the dielectric paste coating film, and the barrier rib patterns are simultaneously fired, thereby forming the electrodes, dielectric layer, and the barrier ribs. The firing atmosphere and temperature may vary according to the properties of the paste or the substrate; however, in general, firing is performed in an air atmosphere. As a firing furnace, a batch type firing furnace or a belt type continuous firing furnace may be used. When a batch type furnace is used, firing is preferably performed by the steps of heating the glass substrate, which is provided with the barrier rib patterns on the dielectric paste coating film, from room temperature to approximately 500° C. for several hours at approximately constant heating rate, then increasing the temperature to 500 to 580° C., which is set beforehand as a firing temperature, for 30 to 40 minutes, and subsequently maintaining the temperature for 15 to 30 minutes.

When the firing temperature is set to 580° C. or less, and the firing time is set to 15 to 30 minutes, formation of firing residues and sagging of the barrier ribs can be suppressed.

In cells surrounded by the barrier ribs thus formed, phosphor layers illuminating red, green, and blue are formed, thereby forming the back panel used for a plasma display panel.

After the back panel thus formed and a front panel are adhered to each other with a seal, gas charging and sealing are performed, and a driver IC is mounted thereon, thereby forming a plasma display.

Hereafter, the present invention will be particularly described with reference to examples. However, the present invention is not limited thereto. The concentration described in the examples means weight percent, unless otherwise stated. In addition, the content of the binder resin shown in the tables below is the content of the resin itself excluding a solvent.

As constituents forming the paste, the following binder resin, polymerization initiator, cross-linking agent, low-melting-point glass powder, and filler are used.

<Binder Resin>

Binder Resin A: a γ-butyrolactone solution containing an acrylic polymer at a concentration of 40% (the acrylic polymer which is formed of a styrene/methyl methacrylate/methacrylic acid copolymer having carboxyl bonded with glycidyl methacrylate by addition reaction, the ratio of the carboxyl to the glycidyl methacrylate being 1 to 0.4 on an equivalent basis; a weight average molecular weight of 43,000, and an acid value of 95)

Binder Resin B: a terpineol solution containing ethyl cellulose at a concentration of 5% (a number average molecular weight of 80,000)

Binder Resin C: a 3-methoxy-3-methylbutanol solution containing poly(isobutyl methacrylate) at a concentration of 5% (a number average molecular weight of 10,000)

<Cross-Linking Agent>

Cross-linking agent A: trimethylolpropane triacrylate (sold under the tradename "TPA330" by Nippon Kayaku Co., Ltd., trifunctional material)

Cross-linking agent B: dipentaerythritol hexaacrylate (sold under the tradename "DPHA" by Nippon Kayaku Co., Ltd., hexafunctional material)

Cross-linking agent C: tetrapropyleneglycol dimethacrylate (sold under the tradename "PDP400" by NOF Corp., bifunctional material)

Cross-linking agent D: bis(2-hydroxy-3-methacryloxypropyl)isopropylamine (sold under the tradename "IP-G" by KYOEISHA CHEMICAL Co., LTD., bifunctional material)

<Urethane Compound>

Urethane Compound A: UA-3348PE (a molecular weight of 22,000, an EO content of 15%)

Urethane Compound B: UA-5348PE (a molecular weight of 39,000, an EO content of 23%)

<Polymerization Initiator>

Polymerization initiator A: 2-benzyl-dimethylamino-1-(4-morpholinophenyl)-1-butanone (an initiator efficiency of 1.0)

Polymerization initiator B: (an initiator efficiency of 1.0)

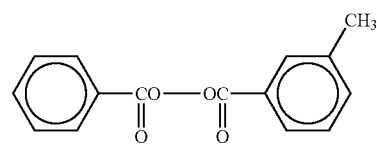

Polymerization initiator C: benzoyl peroxide (an initiator efficiency of 1.0)

Polymerization initiator D: azobis(isobutyronitrile) (an initiator efficiency of 0.7)

<Inorganic Powder>

Low-melting-point glass powder A: 38% of bismuth oxide, 6% of silicon oxide, 20% of boron oxide, 20% of zinc oxide, and 4% of aluminum oxide; a glass transition temperature of 475° C.; a softening point of 515° C.; a coefficient of thermal expansion of $75\times10^{-7}$/° C.; and a density of 4.61 g/cm$^3$ Low-melting-point glass powder B: 62% of bismuth oxide, 14% of silicon oxide, 14% of boron oxide, 4% of zinc oxide, and 2% of aluminum oxide; a glass transition temperature of 435° C.; a softening point of 465° C.; a coefficient of thermal expansion of $75\times10^{-7}$/° C.; a density of 2.54 g/cm$^3$; an average refractive index of 1.586; and an average particle diameter of 2.6 μm Low-melting-point glass powder C: 43.3% of bismuth oxide, 30.4% of silicon oxide, 7.6% of boron oxide, 7.9% of lithium oxide, 4.5% of aluminum oxide, 3.4% of sodium oxide, and 3.1% of zirconium oxide; a glass transition temperature of 423° C.; a softening point of 448° C.; a coefficient of thermal expansion of $111\times10^{-7}$/° C.; and an average particle diameter of 2.5 μm Low-melting-point glass powder D: 42.5% of zinc oxide, 32.5% of boron oxide, 9% of silicon oxide, 4% of aluminum oxide, and 12% of strontium oxide; a glass transition temperature of 560° C.; a softening point of 605° C.; a coefficient of thermal expansion of $75\times10^{-7}$/° C.; a density of 4.32 g/cm$^3$; and an average particle diameter of 1.8 μm Filler A: silicon oxide (sold under the tradename "Aerosil 200" manufactured by Nippon Aerosil Co., Ltd., a softening point of 1,700° C.)

Filler B: conductive titanium oxide (a major axis of 4 μm, a minor axis of 0.4 μm)

<Preparation Method of Electrode Paste>

For preparing electrode pastes A and B, after individual organic components listed in Table 1 were dissolved in dipropyleneglycol monomethyl ether (20 parts by weight) by heating to 50° C., 150 parts by weight of fine silver particles (an average particle diameter of 1.5 μm, a specific surface area of 0.80 m$^2$/g) and 5 parts by weight of a low-melting-point glass powder (a glass transition temperature of 460° C., a softening point of 495° C.) were added to the mixture described above and were then compounded together by a compounding machine.

TABLE 1

| | ADDED AMOUNT (PARTS BY WEIGHT) | | | | | | | |
|---|---|---|---|---|---|---|---|---|
| | BINDER RESIN | | CROSS-LINKING AGENT | | POLYMERIZATION INITIATOR | | URETHANE COMPOUND | |
| ELECTRODE PASTE A | A | 12 | A | 6 | A | 3.0 | — | — |
| ELECTRODE PASTE B | B | 5 | — | — | — | — | B | 5.0 |

<Preparation Method of Dielectric Paste>

For preparing the dielectric paste, after individual organic components listed in Table 3 were dissolved at 50° C. by heating, individual inorganic components shown in Table 3 were added to the mixture described above and were then compounded together by a three-roll mill.

<Preparation Method of Barrier Rib Paste>

For preparing barrier rib pastes A and B, after individual organic components listed in Table 2 were dissolved in 20 parts by weight of dipropyleneglycol monomethyl ether by heating to 50° C., 24 parts by weight of a low-melting-point glass powder (a glass transition temperature of 491° C., a softening point of 528° C.) and 6 parts by weight of a filler (an average refractive index of 1.59, a glass transition temperature of 652° C., an average particle diameter of 2.4 µm) were stirred by heating and were then compounded together with the mixture described above by a compounding machine.

configuration 3,000 µm in pitch and 1,000 µm in line width was disposed so as to intersect perpendicularly address electrodes, and exposure was then performed. The barrier rib paste A was further applied to the coating film thus exposed, and was then dried, thereby forming a coating film 90 µm thick after drying. On this coating film thus formed, a photomask having a stripe configuration 250 µm in pitch and 30 µm in line width was disposed in parallel to the address electrodes, and exposure was then performed. After exposure, development was performed in an ethanolamine aqueous solution at a concentration of 0.5%, the grid shaped barrier rib patterns were obtained which were formed of major barrier rib patterns having a pitch of 250 µm, a line width of 40 µm, and a height of 180 µm and sub-barrier rib patterns having a pitch of 3,000 µm, a line width of 1,000 µm, and a height of 90 µm.

After the electrode patterns, the dielectric paste coating film, and the barrier rib pattern were formed as described above, they were simultaneously fired. Firing was performed

TABLE 2

| | ADDED AMOUNT (PARTS BY WEIGHT) | | | | | | | |
|---|---|---|---|---|---|---|---|---|
| | BINDER RESIN | | CROSS-LINKING AGENT | | POLYMERIZATION INITIATOR | | URETHANE COMPOUND | |
| Barrier Rib Paste A | A | 7 | A | 3 | A | 1.5 | A | 1.5 |
| Barrier Rib Paste B | B | 4 | — | — | — | — | B | 6.0 |

EXAMPLE 1

On a 125 mm square glass substrate (sold under the tradename "PD200" manufactured by Asahi Glass Co., Ltd.), electrode paste A was applied by a screen printing method (screen mesh: SUS#325) so as to obtain a thickness of 5 µm after drying, and was then dried. After drying, exposure was performed by using a photomask having a stripe configuration 250 µm in pitch and 50 µm in line width. After exposure, development was performed in an ethanolamine aqueous solution at a concentration of 0.5%, so that stripe shaped electrode patterns having a pitch of 250 µm and a line width of 60 µm were obtained. Subsequently, curing was performed at 200° C. for 15 minutes by a hot air dryer.

On the glass substrate provided with the electrode patterns, the dielectric paste shown in Table 3 was applied by a screen printing method (screen mesh: SUS#325) so as to obtain a thickness of 15 µm after drying, and was then cured at 150° C. for 15 minutes by a hot air dryer.

Next, barrier rib paste A was applied so as to obtain a thickness of 90 µm after drying, and was then dried. After drying, on this coating film, a photomask having a stripe using a roller hearth firing furnace at 570° C. for 15 minutes. As a result, there were provided stripe shaped electrodes 250 µm in pitch, 50 µm in line width, and 3 µm thick; a dielectric layer 10 µm thick; and grid shaped barrier ribs formed of major barrier ribs 250 µm in pitch, 30 µm in line width, and 120 µm high, and sub-barrier ribs 3,000 µm in pitch, 800 µm in line width, and 60 µm high. No cracks and disconnections could be observed in each layer thus formed.

The number of cracks formed in the dielectric layer was measured by counting the number of cracks present on the entire surface of the dielectric layer. In addition, in order to measure the number of voids in the dielectric layer and the compactness thereof, the cross-section of the dielectric layer was observed by a scanning electron microscope. The number of voids having a diameter of 1 µm or more present on a cross-section of 100 µm² were counted. For the evaluation of the compactness, a dielectric layer having a uniform cross-section was classified as "good", and a dielectric layer having a nonuniform cross-section was classified as "bad". The evaluation results are shown in Table 3.

After phosphor layers having red, green, and blue colors were formed on the substrate provided with the barrier ribs thus formed, the substrate was adhered to a front panel with a seal, and subsequently gas charging and sealing was performed, thereby forming a plasma display panel. A superior display in which display defects such as crosstalk will not occur could be obtained.

EXAMPLES 2 TO 6

The same steps as those in example 1 were performed except that the composition of the dielectric paste and curing conditions were changed as shown in Table 3. Substantially no defects could be observed in the electrodes, the dielectric layer, and the barrier ribs, and hence a suitable member for display could be obtained.

EXAMPLE 7

The same steps as those in example 1 were performed except that the composition of the dielectric paste was changed as shown in Table 3. Since the added amount of the initiator was not enough, and the cross-lining density of the dielectric paste coating film was not sufficient, the dielectric layer had three cracks formed at an edge portion thereof; however, the member thus formed was also be usable for display in practice.

EXAMPLE 8

The same steps as those in example 1 were performed except that the composition of the dielectric paste was changed as shown in Table 3. Since the added amount of the initiator was large, and the binder-removing ability of the dielectric paste coating film was degraded, the dielectric layer had an increased number of voids therein; however, the member thus formed was also be usable for display in practice.

EXAMPLE 9

The same steps as those in example 1 were performed except that thermal polymerization initiator C was used instead of thermal polymerization initiator B. Substantially no defects could be observed, and a suitable member for display could be obtained. However, since the solubility of thermal polymerization initiator C is low, when the dielectric paste was held at room temperature for one week after the preparation thereof, the thermal polymerization initiator was partly precipitated. When the steps of example 1 were performed by using this dielectric paste, the cross-linking density of the dielectric paste coating film was decreased, resulting in eight cracks formed at an edge portion of the dielectric layer.

EXAMPLE 10

The dielectric paste used in example 1 was held at room temperature for one week after the preparation thereof, and the steps of example 1 were performed by using this dielectric paste. Substantially no defects could be observed in the electrodes, the dielectric layer, and the barrier ribs, and hence a suitable member for display could be obtained.

EXAMPLE 11

The same steps as those in example 1 were performed except that thermal polymerization initiator D was used instead of thermal polymerization initiator B. Since the initiator efficiency of thermal polymerization initiator D was low, the cross-linking density of the dielectric paste coating film was decreased, and the dielectric layer had seven cracks at an edge portion thereof; however, the member thus formed was also be usable for display in practice.

EXAMPLE 12

The same steps as those in example 1 were performed except that cross-lining agent C was-used instead of cross-linking agent A. Since cross-linking agent C is bifunctional, the cross-linking density of the dielectric paste coating film was decreased, and the dielectric layer had six cracks at an edge portion thereof; however, the member thus formed was also be usable for display in practice.

EXAMPLE 13

The same steps as those in example 1 were performed except that curing after the formation of the electrode patterns was performed at 120° C. Although having five cracks at an edge portion, the member thus formed was also be usable for display in practice.

EXAMPLE 14

The same steps as those in example 1 were performed except that curing after the formation of the dielectric paste coating film was performed at 120° C. Since the dielectric paste coating film was not sufficiently cured, the dielectric layer had nine cracks at an edge portion thereof; however, the member thus formed was also be usable for display in practice.

EXAMPLE 15

On a 125 mm square glass substrate (sold under the tradename "PD200" manufactured by Asahi Glass Co., Ltd.), electrode paste B was applied by a screen printing method so as to obtain a thickness of 10 μm after drying, and was then dried. For this screen printing, a screen mesh having a stripe configuration 360 μm in pitch and 80 μm in line width was used, so that stripe shaped electrode patterns 360 μm in pitch and 85 μm in line width were obtained. Subsequently, curing was performed at 250° C. for 5 minutes by an IR dryer.

On the glass substrate provided with the electrode patterns, the dielectric paste shown in Table 3 was applied by a screen printing method (screen mesh: SUS#325 with no pattern) so as to obtain a thickness of 20 μm after drying, and was then cured at 230° C. for 30 minutes by an IR dryer.

Next, barrier rib paste B was applied by a screen printing method. A screen mesh having a stripe configuration 360 μm in pitch and 60 μm in line width was disposed so as to be parallel with the electrode patterns. After coating and drying are repeated, stripe shaped barrier rib patterns 360 μm in pitch, 60 μm in line width, and 200 μm high were obtained.

After the electrode patterns, the dielectric paste coating film, and the barrier rib pattern were formed as described above, they were simultaneously fired. Firing was performed using a roller hearth firing furnace at 590° C. for 10 minutes. As a result, there are provided stripe shaped electrodes 360 μm in pitch, 80 μm in line width, and 5 μm thick; a dielectric layer 14 μm thick; and stripe shaped barrier ribs 360 μm in pitch, 50 μm in line width, and 130 μm high. Substantially no cracks and disconnections could be observed in the electrodes, the dielectric layer, and the barrier ribs thus formed, and hence a suitable member for display could be obtained.

EXAMPLE 16

The same steps as those in example 15 were performed except that no curing was performed after the formation of the electrode patterns. Since edge curling of the electrode patterns was large, the dielectric layer has 11 cracks at an edge portion thereof; however, the member thus formed was also be usable for display in practice.

COMPARATIVE EXAMPLE 1

The same steps as those in example 15 were performed except that no thermal polymerization initiator was used and that no curing was performed after the formations of the electrodes patterns and the dielectric paste coating film. Since a number of disconnections were observed in the electrode patterns, and 100 or more cracks were observed on the entire surface of the dielectric layer, a suitable member for display could not be obtained.

COMPARATIVE EXAMPLE 2

The same steps as those in example 15 were performed except that no curing was performed after the application of the dielectric paste. Since the cross-linking density of the dielectric paste coating film was decreased, approximately 80 cracks were observed on the entire surface of the dielectric layer, and hence a suitable member for display could not be obtained.

COMPARATIVE EXAMPLE 3

The same steps as those in example 15 were performed except that no curing was performed after the formation of the electrodes patterns and after the application of the dielectric paste. Since a number of disconnections were observed in the electrode patterns, and 100 or more cracks were formed on the entire surface of the dielectric layer, a suitable member for display could not be obtained.

According to the dielectric paste and the manufacturing method of a plasma display of the present invention, the electrode patterns, the dielectric paste coating film, and the barrier rib patterns can be simultaneously fired without any defects such as cracks or disconnections. Hence, a plasma display can be manufactured at reasonable cost.

TABLE 3

| | ADDED AMOUNT (PARTS BY WEIGHT) | | | | | | | | | | | | CURING CONDITIONS FOR ELECTRODE PATTERN | |
|---|---|---|---|---|---|---|---|---|---|---|---|---|---|---|
| | BINDER RESIN | | CROSS- LINKING AGENT | | POLYMERIZATION INITIATOR | | URETHANE COMPOUND | | LOW- MELTING- POINT GLASS | | FILLER A | FILLER B | TEMPERATURE (° C.) | TIME (MIN) |
| EXAMPLE 1 | B | 8 | A | 92 | B | 12.3 | A | 1.2 | A | 246 | 106 | 2 | 200 | 15 |
| EXAMPLE 2 | C | 6 | B | 94 | B | 3.3 | B | 0.7 | B | 188 | 71 | 1 | 140 | 3 |
| EXAMPLE 3 | A | 50 | A | 50 | B | 10.0 | A | 4.4 | A | 200 | 136 | 2 | 250 | 10 |
| EXAMPLE 4 | B | 5 | B | 95 | B | 23.8 | B | 14.3 | B | 190 | 72 | 2 | 140 | 3 |
| EXAMPLE 5 | B | 6 | A | 94 | B | 12.5 | A | 3.1 | A | 281 | 94 | 3 | 150 | 15 |
| EXAMPLE 6 | C | 8 | B | 92 | B | 12.3 | B | 6.2 | B | 154 | 184 | 2 | 250 | 20 |
| EXAMPLE 7 | B | 6 | A | 94 | B | 2.4 | A | 2.4 | A | 188 | 94 | 2 | 200 | 15 |
| EXAMPLE 8 | C | 8 | B | 92 | B | 30.8 | B | 3.1 | B | 246 | 123 | 2 | 200 | 15 |
| EXAMPLE 9 | B | 8 | A | 92 | C | 12.3 | A | 3.1 | A | 246 | 93 | 2 | 200 | 15 |
| EXAMPLE 10 | B | 8 | A | 92 | B | 12.3 | A | 1.2 | A | 246 | 93 | 2 | 200 | 15 |
| EXAMPLE 11 | B | 8 | B | 92 | D | 12.3 | B | 3.1 | B | 246 | 93 | 2 | 200 | 15 |
| EXAMPLE 12 | B | 8 | C | 92 | A | 12.3 | A | 3.1 | A | 246 | 93 | 2 | 200 | 15 |
| EXAMPLE 13 | B | 8 | A | 92 | B | 12.3 | A | 1.2 | A | 246 | 93 | 2 | 120 | 15 |
| EXAMPLE 14 | B | 8 | A | 92 | B | 12.3 | A | 1.2 | A | 246 | 93 | 2 | 200 | 15 |
| EXAMPLE 15 | B | 8 | A | 92 | B | 12.3 | A | 12.3 | A | 246 | 93 | 2 | 200 | 15 |
| EXAMPLE 16 | B | 8 | A | 92 | B | 12.3 | A | 12.3 | A | 246 | 93 | 2 | — | 0 |
| COMPARATIVE EXAMPLE 1 | B | 8 | A | 92 | — | 0.0 | A | 12.3 | A | 246 | 93 | 2 | — | 0 |
| COMPARATIVE EXAMPLE 2 | B | 8 | A | 92 | B | 12.3 | A | 12.3 | A | 246 | 93 | 2 | 200 | 15 |
| COMPARATIVE EXAMPLE 3 | B | 8 | A | 92 | B | 12.3 | A | 12.3 | A | 246 | 93 | 2 | — | 0 |

| | CURING CONDITIONS FOR DIELECTRIC PASTE COATING FILM | | EVALUATION | | |
|---|---|---|---|---|---|
| | TEMPERATURE (° C.) | TIME (MIN) | CRACKS ON DIELECTRIC LAYER (NUMBER) | VOIDS (NUMBER/ 100 μm$^2$) | COMPACTNESS |
| EXAMPLE 1 | 150 | 15 | 0 | 0 | GOOD |
| EXAMPLE 2 | 140 | 3 | 0 | 0 | GOOD |
| EXAMPLE 3 | 250 | 10 | 0 | 0 | GOOD |
| EXAMPLE 4 | 150 | 15 | 1 | 0 | GOOD |
| EXAMPLE 5 | 200 | 10 | 0 | 0 | GOOD |

TABLE 3-continued

| | | | | | |
|---|---|---|---|---|---|
| EXAMPLE 6 | 150 | 30 | 0 | 0 | SLIGHTLY BAD |
| EXAMPLE 7 | 150 | 15 | 3 | 0 | GOOD |
| EXAMPLE 8 | 150 | 15 | 0 | 5 | GOOD |
| EXAMPLE 9 | 150 | 15 | 1 | 0 | GOOD |
| EXAMPLE 10 | 150 | 15 | 0 | 0 | GOOD |
| EXAMPLE 11 | 150 | 15 | 7 | 0 | GOOD |
| EXAMPLE 12 | 150 | 15 | 6 | 0 | GOOD |
| EXAMPLE 13 | 150 | 15 | 5 | 0 | GOOD |
| EXAMPLE 14 | 120 | 15 | 9 | 0 | GOOD |
| EXAMPLE 15 | 150 | 15 | 0 | 0 | GOOD |
| EXAMPLE 16 | 150 | 15 | 11 | 0 | GOOD |
| COMPARATIVE EXAMPLE 1 | — | 0 | >100 | 0 | GOOD |
| COMPARATIVE EXAMPLE 2 | — | 0 | to 80 | 0 | GOOD |
| COMPARATIVE EXAMPLE 3 | — | 0 | >100 | 0 | GOOD |

What is claimed is:

1. A method of manufacturing a plasma display, comprising:
    forming electrode patterns using an electrode paste;
    forming a dielectric paste coating film using a dielectric paste;
    forming barrier rib patterns using a barrier rib paste;
    simultaneously firing at least the electrode patterns, the dielectric paste coating film, and the barrier rib patterns; and
    curing the electrode patterns after forming the electrode patterns and before forming a dielectric paste coating film; and
    curing after forming a dielectric paste coating film using a dielectric paste.

2. A method of manufacturing a plasma display, according to claim 1, wherein the curing after forming a dielectric paste coating film using a dielectric paste is performed at a temperature in the range of from 140 to 300°.

3. A method of manufacturing a plasma display, according to claim 1, wherein the curing after forming a dielectric paste coating film using a dielectric paste is before forming barrier rib patterns using a barrier rib paste.

4. A method of manufacturing a plasma display, according to claim 1, wherein the electrode pattern curing is performed at a temperature in the range of from 140 to 300°.

5. A method of manufacturing a plasma display, according to claim 1, wherein at least one of the electrode paste and the barrier rib paste has photosensitivity.

6. A method of manufacturing a plasma display, comprising:
    forming electrode patterns using an electrode paste;
    forming a dielectric paste coating film using a dielectric paste; comprising:
    a binder resin;
    a cross-linking agent;
    a thermal polymerization initiator; and
    an inorganic powder;
    wherein the inorganic powder comprises a glass powder having a softening point of 450 to 600° C. and, the content of the glass powder is 150 to 300 parts by weight to 100 parts by weight of the total of the binder resin and the cross-linking agent;
    forming barrier rib patterns using a barrier rib paste;
    simultaneously firing at least the electrode patterns, the dielectric paste coating film, and the barrier rib patterns; and
    performing curing after forming a dielectric paste coating film using a dielectric paste.

7. A method of manufacturing a plasma display, according to claim 6, wherein the inorganic powder comprises a glass powder having a softening point of 450 to 600° C. and a filler having a softening point of 650° or more, the content of the glass powder is 150 to 300 parts by weight to 100 parts by weight of the total of the binder resin and the cross-linking agent and the content of the filler is 50 to 200 parts by weight to 100 parts by weight of the total of the binder resin and the cross-linking agent.

* * * * *